United States Patent
Petroski et al.

(10) Patent No.: US 9,859,025 B2
(45) Date of Patent: *Jan. 2, 2018

(54) FUEL ASSEMBLY

(71) Applicant: TerraPower, LLC, Bellevue, WA (US)

(72) Inventors: Robert C. Petroski, Seattle, WA (US); Gary Povirk, Bellevue, WA (US); Philip Schloss, Bellevue, WA (US); Ashok Odedra, Bellevue, WA (US); Michael E. Cohen, Seattle, WA (US)

(73) Assignee: TerraPower, LLC, Bellevue, WA (US)

( * ) Notice: Subject to any disclaimer, the term of this patent is extended or adjusted under 35 U.S.C. 154(b) by 397 days.

This patent is subject to a terminal disclaimer.

(21) Appl. No.: 13/794,604

(22) Filed: Mar. 11, 2013

(65) Prior Publication Data

US 2014/0185734 A1    Jul. 3, 2014

Related U.S. Application Data

(60) Provisional application No. 61/747,064, filed on Dec. 28, 2012.

(51) Int. Cl.

| | |
|---|---|
| *G21C 3/32* | (2006.01) |
| *G21C 3/04* | (2006.01) |
| *G21C 3/06* | (2006.01) |
| *G21C 3/16* | (2006.01) |
| *G21C 3/324* | (2006.01) |
| *G21C 3/334* | (2006.01) |
| *G21C 21/10* | (2006.01) |

(52) U.S. Cl.
CPC .......... *G21C 3/04* (2013.01); *G21C 3/06* (2013.01); *G21C 3/16* (2013.01); *G21C 3/32* (2013.01); *G21C 3/324* (2013.01); *G21C 3/334* (2013.01); *G21C 21/10* (2013.01); *G21C 2003/047* (2013.01); *Y02E 30/40* (2013.01)

(58) Field of Classification Search
CPC . G21C 3/32; G21C 3/324; G21C 3/16; G21C 3/06; G21C 3/04
USPC .................. 376/429, 431, 434, 455
See application file for complete search history.

(56) References Cited

U.S. PATENT DOCUMENTS

| | | | |
|---|---|---|---|
| 2,798,848 A * | 7/1957 | Kingdon ................. | 376/455 |
| 3,130,130 A * | 4/1964 | Haines et al. ............ | 376/461 |
| 3,244,599 A * | 4/1966 | Hildebrand .............. | 376/455 |
| 3,259,766 A | 7/1966 | Beckjord et al. | |
| 3,713,971 A | 1/1973 | Van Santen et al. | |
| 3,969,186 A | 7/1976 | Thompson et al. | |
| 4,022,662 A | 5/1977 | Gordon et al. | |

(Continued)

FOREIGN PATENT DOCUMENTS

| | | | |
|---|---|---|---|
| GB | 1174201 | * | 12/1969 |
| JP | 2004301831 A | | 10/2004 |

(Continued)

OTHER PUBLICATIONS

PCT International Search Report; International App. No. PCT/US 13/77439; Jul. 24, 2014; pp. 1-4.

(Continued)

*Primary Examiner* — Jack W Keith
*Assistant Examiner* — Daniel Wasil

(57) ABSTRACT

Disclosed embodiments include fuel ducts, fuel assemblies, methods of making fuel ducts, methods of making a fuel assembly, and methods of using a fuel assembly.

23 Claims, 10 Drawing Sheets

(56) References Cited

U.S. PATENT DOCUMENTS

| | | | |
|---|---|---|---|
| 4,050,985 A * | 9/1977 | Yant et al. | 376/460 |
| 4,075,058 A | 2/1978 | Noyes | |
| 4,110,160 A * | 8/1978 | Hayashi | G21C 3/33 |
| | | | 376/462 |
| 4,147,591 A | 4/1979 | Miki | |
| 4,306,937 A | 12/1981 | Hensolt et al. | |
| 4,871,510 A | 10/1989 | Aoyama et al. | |
| 5,247,550 A | 9/1993 | Perkins et al. | |
| 5,383,228 A | 1/1995 | Armijo et al. | |
| 5,512,237 A | 4/1996 | Stigenberg | |
| 5,640,434 A * | 6/1997 | Rottenberg | 376/431 |
| 6,327,324 B2 * | 12/2001 | Nylund | 376/429 |
| 6,531,007 B1 | 3/2003 | Nilsson et al. | |
| 2002/0003849 A1 * | 1/2002 | Drillon et al. | 376/260 |
| 2009/0175404 A1 | 7/2009 | Singh et al. | |
| 2010/0266086 A1 * | 10/2010 | Ahlfeld | 376/210 |
| 2011/0194666 A1 | 8/2011 | Walters | |
| 2013/0089174 A1 * | 4/2013 | Diamond | G21C 1/20 |
| | | | 376/366 |

FOREIGN PATENT DOCUMENTS

| | | |
|---|---|---|
| WO | WO-93/07303 | 4/1993 |
| WO | WO2014105801 | 7/2014 |

OTHER PUBLICATIONS

Emigh, R.A., Effect of Multiple Austenitizing Treatments on HT-9 Steels, M.S. Thesis, Lawrence Berkeley Laboratory, University of California, Materials and Molecular Research Division, Dec. 1985.

Kim, T.K., et al., Fuel Cycle Analysis of Once-Through Nuclear Systems, Argonne National Laboratory, Aug. 10, 2010.

Lee, B.O., Performance Evaluation of Metallic Fuel for SFR, International Conference on Fast Reactors and Related Fuel Cycles (FR09), Korea Atomic Energy Institute; Kyoto, Japan, Dec. 9, 2009.

Redmon, J.W., A Study of the Effects of Austenitizing and Tempering Heat Treatments on the Alloy HT-9, Technical Report from Auburn University Engineering Department, Auburn, Alabama.

Smidt, et al., Swelling Behavior of Commercial Ferritic Alloy, EM-12 and HT-9, as Assessed by Heavy Ion Bombardment, ASTM International, 1976.

Vollmer, J et al., Assessment of Annular Fuel for a Commercial-Scale Traveling Wave Reactor, Oct. 2011.

Wilcox, et al., Austenitizing and Microstructure of a HT-9 Steel, Auburn University, Copyright Elsevier Science Publishing Co, Inc., 1984.

PCT International Preliminary Report on Patentability and Written Opinion; International App. No. PCT/US 13/77439; Jun. 30, 2015.

* cited by examiner

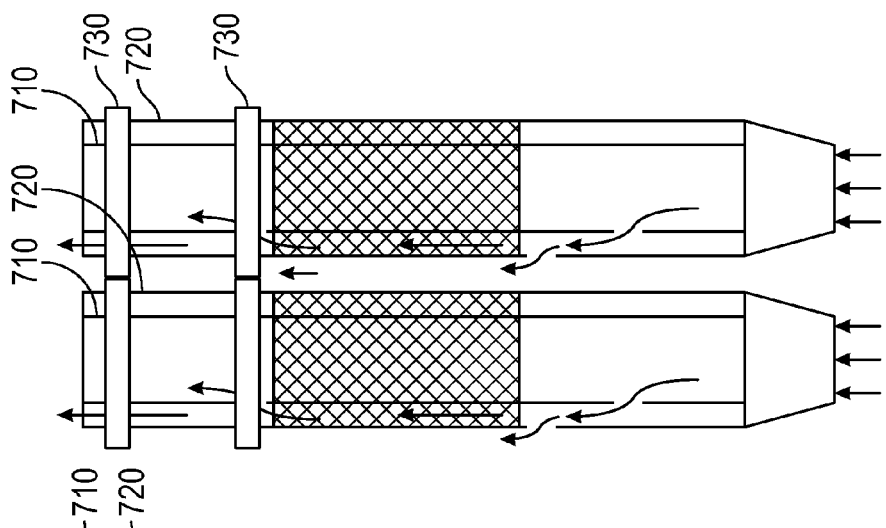
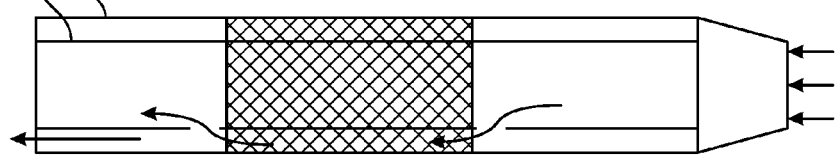
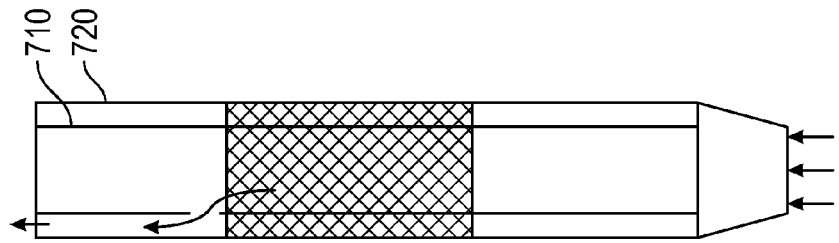
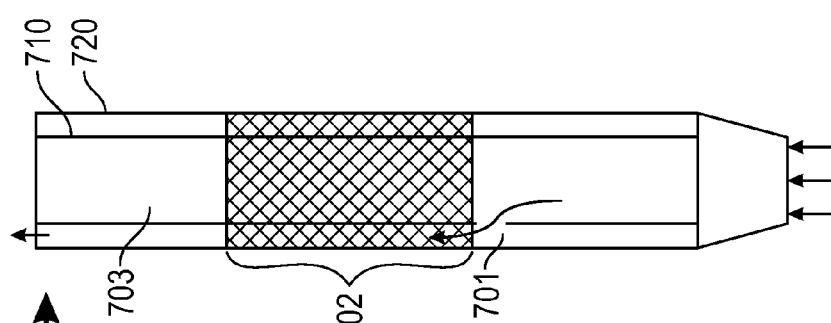
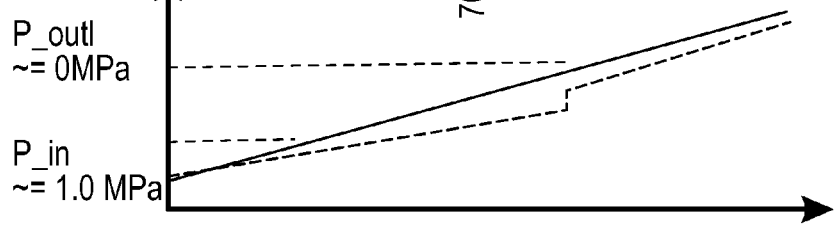

FUEL ASSEMBLY

CROSS-REFERENCE TO RELATED APPLICATIONS

This application claims the benefit of U.S. Provisional Application No. 61/747,064, filed Dec. 28, 2012, which is incorporated herein by reference in its entirety.

BACKGROUND

The present patent application relates to fuel assemblies and methods related to same.

SUMMARY

Disclosed embodiments include fuel ducts, fuel assemblies, methods of making and using same.

The foregoing is a summary and thus may contain simplifications, generalizations, inclusions, and/or omissions of detail; consequently, those skilled in the art will appreciate that the summary is illustrative only and is not intended to be in any way limiting. In addition to any illustrative aspects, embodiments, and features described herein, further aspects, embodiments, and features will become apparent by reference to the drawings and the following detailed description. Other aspects, features, and advantages of the devices and/or processes and/or other subject matter described herein will become apparent in the teachings set forth.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7a-7d illustrate the various embodiments of penetrations in the first and/or second hollow structures of the fuel assembly in one exemplary embodiment.

DETAILED DESCRIPTION

Introduction

Figure 1A:
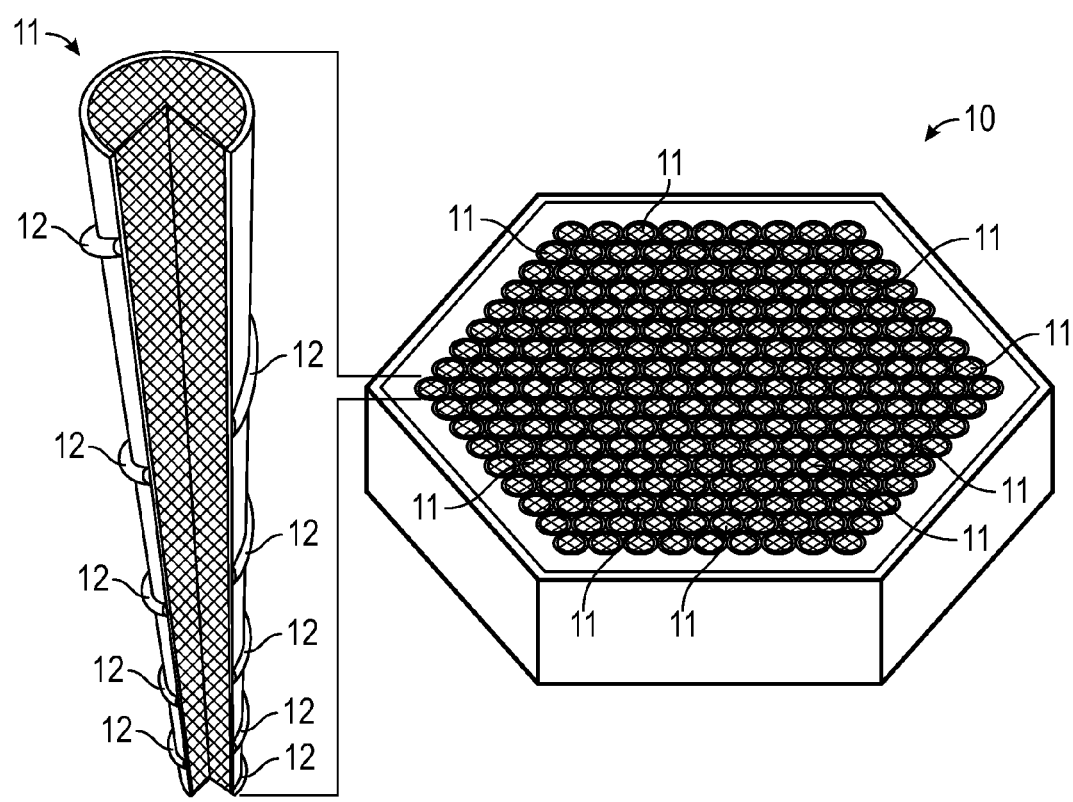
FIGS. 1a-1b provide partial-cutaway perspective views in schematic form of an illustrative (a) nuclear fuel assembly and (b) fuel element in one exemplary embodiment.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

By way of overview, provided in one embodiment is a fuel assembly, the fuel assembly comprising: a fuel duct, including: a first hollow structure having a first cross-sectional geometry, and a second hollow structure having a second cross-sectional geometry, the second hollow structure disposed exterior to the first hollow structure, and the second cross-sectional geometry being different from the first cross-sectional geometry.

Provided in another embodiment is a fuel assembly, the fuel assembly comprising: a fuel duct, including: a first hollow structure having at least one dimension that is changeable under stress, and a second hollow structure disposed exterior to the first hollow structure, the first hollow structure and the second hollow structure defining a space therebetween; the second hollow structure being adapted to distribute therethrough at least a portion of the stress of the first hollow structure.

Provided in another embodiment is a fuel assembly, the fuel assembly comprising: a fuel, a plurality of fuel elements, and a plurality of fuel ducts having the plurality of fuel elements disposed therein, at least one of the plurality of the fuel ducts including: a first hollow structure having a first cross-sectional geometry, and a second hollow structure having a second cross-sectional geometry, the second hollow structure disposed exterior to the first hollow structure, and the second cross-sectional geometry being different from the first cross-sectional geometry.

Provided in another embodiment is a method of making a fuel assembly, the method comprising: forming a first hollow structure adapted to change at least one dimension thereof under stress and a second hollow structure adapted to distribute therethrough at least a portion of the stress of the first hollow structure; disposing the first hollow structure interior to the second hollow structure to form a fuel duct such that a space is defined between the first hollow structure and the second hollow structure.

Provided in another embodiment is a method of making a fuel assembly, comprising: forming a first hollow structure having a first cross-sectional geometry; forming a second hollow structure having a second cross-sectional geometry that is different from the first cross-sectional geometry; and disposing the first hollow structure interior to the second hollow structure to form a fuel duct.

Provided in another embodiment is a method of using a fuel assembly, comprising: generating heat with a plurality of fuel elements disposed within a first hollow structure, the first hollow structure being disposed within a second hollow structure; subjecting the first hollow structure to stress; and distributing the stress of the first hollow structure through the second hollow structure.

Fuel Assembly

Figure 1B:
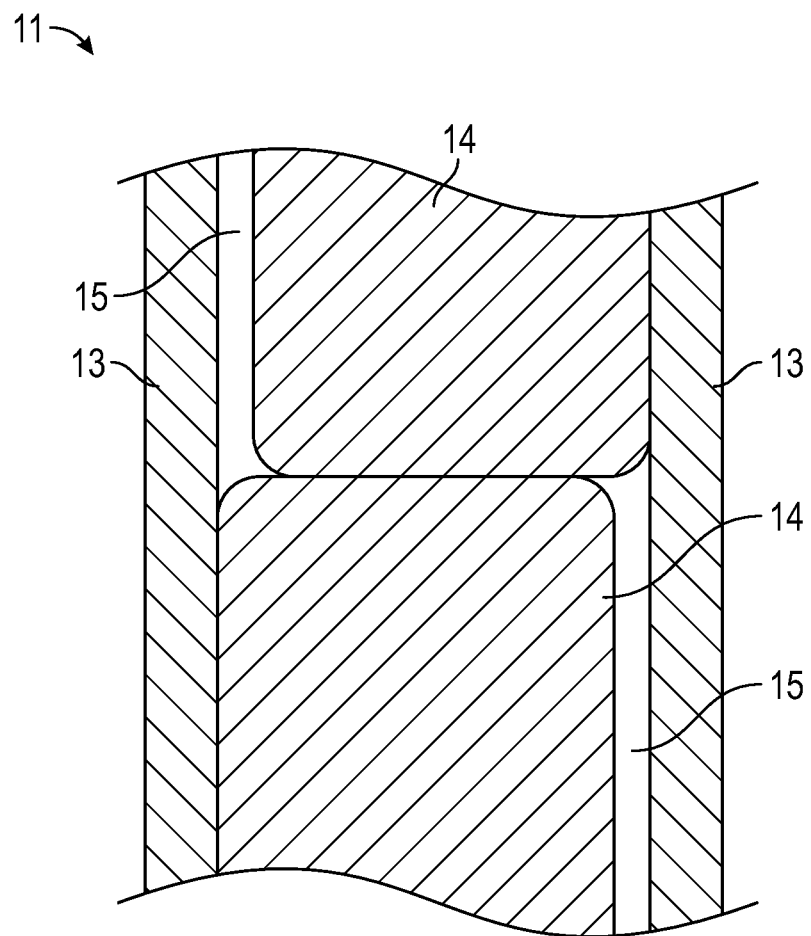

FIG. 1a provides a partial illustration of a nuclear fuel assembly 10 in accordance with one embodiment. The fuel assembly may be a fissile nuclear fuel assembly or a fertile nuclear fuel assembly. The assembly may include fuel elements (or "fuel rods" or "fuel pins") 11. FIG. 1b provides a partial illustration of a fuel element 11 in accordance with one embodiment. As shown in this embodiment, the fuel element 11 may include a cladding material 13, a fuel 14, and, in some instances, at least one gap 15.

A fuel may be sealed within a cavity by the exterior cladding material 13. In some instances, the multiple fuel materials may be stacked axially as shown in FIG. 1b, but this need not be the case. For example, a fuel element may contain only one fuel material. In one embodiment, gap(s) 15 may be present between the fuel material and the cladding material, though gap(s) need not be present. In one embodiment, the gap is filled with a pressurized atmosphere, such as a pressured helium atmosphere.

A fuel may contain any fissionable material. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. The term "element" as represented by a chemical symbol herein may refer to one that is found in the Periodic Table—this is not to be confused with the "element" of a "fuel element". In one embodiment, the fuel may include at least about 90 wt % U—e.g., at least 95 wt %, 98 wt %, 99 wt %, 99.5 wt %, 99.9 wt %, 99.99 wt %, or higher of U. The fuel may further include a refractory material, which may include at least one element chosen from Nb, Mo, Ta, W, Re, Zr, V, Ti, Cr, Ru, Rh, Os, Ir, and Hf. In one embodiment, the fuel may include additional burnable poisons, such as boron, gadolinium, or indium. In one embodiment, the interior of the first hollow structure of the fuel duct may include a plurality of fuel elements.

In one embodiment, the metal fuel may be alloyed with about 3 wt % to about 10 wt % zirconium to dimensionally stabilize the alloy during irradiation and to inhibit low-temperature eutectic and corrosion damage of the cladding. A sodium thermal bond fills the gap that exists between the alloy fuel and the inner wall of the clad tube to allow for fuel swelling and to provide efficient heat transfer, which may keep the fuel temperatures low. In one embodiment, individual fuel elements 11 may have a thin wire 12 from about 0.8 mm diameter to about 1.6 mm diameter helically wrapped around the circumference of the clad tubing to provide coolant space and mechanical separation of individual fuel elements 56 within the housing of the fuel assemblies 18 and 20 (that also serve as the coolant duct). In one embodiment, the cladding 13, and/or wire wrap 12 may be fabricated from ferritic-martensitic steel because of its irradiation performance as indicated by a body of empirical data.

Fuel Element

A "fuel element", such as element 11 shown in FIGS. 1a-1b, in a fuel assembly of a power generating reactor may generally take the form of a cylindrical rod. The fuel element may be a part of a power generating reactor, which is a part of a nuclear power plant. Depending on the application, the fuel element may have any suitable dimensions with respect to its length and diameter. The fuel element may include a cladding layer 13 and a fuel 14 disposed interior to the cladding layer 13. In the case of a nuclear reactor, the fuel may contain (or be) a nuclear fuel. In one embodiment, the nuclear fuel may be an annular nuclear fuel. The fuel element may additionally include a liner disposed between the nuclear fuel 14 and the cladding layer 13. The liner may contain multiple layers.

The fuel may have any geometry. In one embodiment, the fuel has an annular geometry. In such an embodiment, a fuel in an annular form may allow a desirable level of fuel density to be achieved after a certain level of burn-up. Also, such an annular configuration may maintain compressive forces between the fuel and the cladding to promote thermal transport. The fuel may be tailored to have various properties, depending on the application. For example, the fuel may have any level of density. In one embodiment, it is desirable to have a high density of fuel, such as one as close to theoretical density uranium (in the case of a fuel containing uranium) as possible. In another embodiment, having a high porosity (low density) may prevent formation of additional internal voids during irradiation, decreasing fuel pressure on structural material, such as cladding, during operation of the nuclear fuel.

The cladding material for the cladding layer 13 may include any suitable material, depending on the application. In one embodiment, the cladding layer 13 may include at least one material chosen from a metal, a metal alloy, and a ceramic. In one embodiment, the cladding layer 13 may contain a refractory material, such as a refractory metal including at least one element chosen from Nb, Mo, Ta, W, Re, Zr, V, Ti, Cr, Ru, Rh, Os, Ir, Nd, and Hf. In another embodiment, the cladding material may be chosen from a ceramic material, such as silicon carbide or aluminum oxide (alumina).

A metal alloy in cladding layer 13 may be, in one exemplary embodiment, steel. The steel may be chosen from an austenitic steel, a ferritic-martensitic steel, an oxide-dispersed steel, T91 steel, T92 steel, HT9 steel, 316 steel, and 304 steel. The steel may have any type of microstructure. For example, the steel may include at least one of a martensite phase, a ferrite phase, and an austenite phase. In one embodiment, substantially all of the steel has at least one phase chosen from a martensite phase, a ferrite phase, and an austenite phase. Depending on the application, the microstructure may be tailored to have a particular phase (or phases). The cladding layer 13 may include an iron-based composition as described below.

At least some of the components of the fuel elements may be bonded. The bonding may be physical (e.g., mechanical) or chemical. In one embodiment, the nuclear fuel and the cladding are mechanically bonded. In one embodiment, the first layer and the second layer are mechanically bonded.

Stress Distribution

In one aspect, the various structural components of the fuel assembly described herein may work together to distribute stress. The stress may refer to bending stress, tensile stress, axial stress, compressive stress, hoop stress, or combinations thereof. The stress may arise from the interior of the fuel assembly, such as the pressure of the gas and/or coolant in the interior of the duct, which gas has a tendency to create a pressure pushing outward.

Figures 2A, 2B:
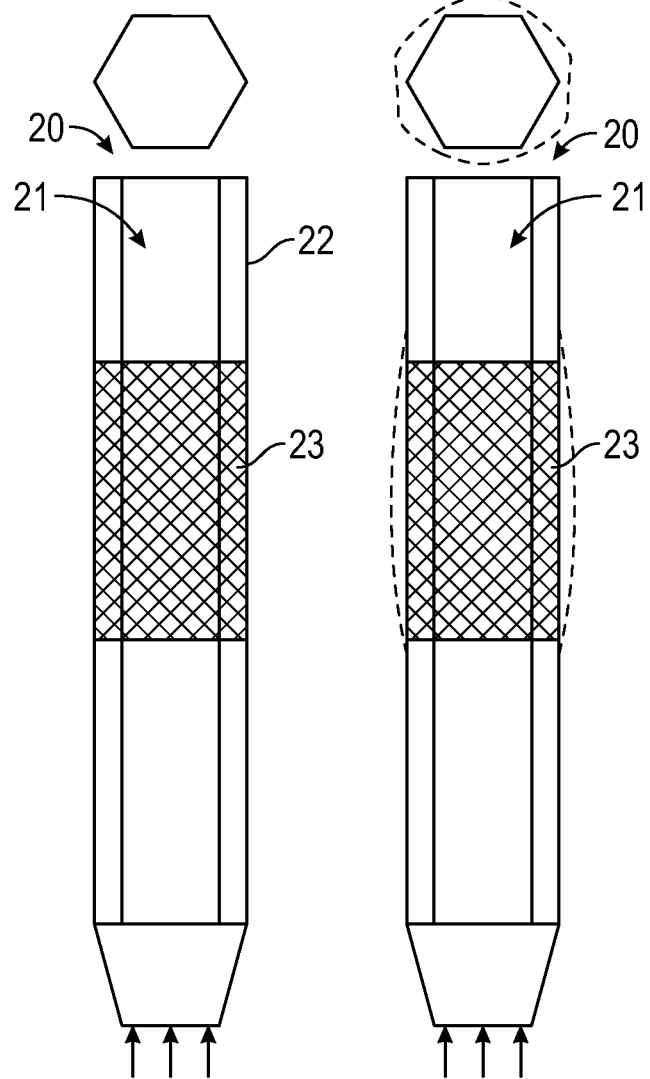
FIGS. 2a-2b provide schematics showing the pressure distribution and swelling behavior of a fuel assembly in a nuclear reactor in one exemplary embodiment.

Referring to FIGS. 2a-2b, the pressure differential between the interior 21 and exterior 22 of a fuel duct 20 may create a driving force that causes the wall of the fuel duct 20 to stretch—i.e. to be in tension. The pressure differential may drive both thermally induced creep and radiation induced creep (see FIG. 2a vs. FIG. 2b for non-creeping structure and creeping structure, respectively) in a pre-existing duct design. Bulk swelling of structural materials in region 23 in nuclear reactors may also occur. The swelling may be independent of coolant pressure and can lead to bending stresses within the assembly structure. A further component of internal stress can be due to swelling of the fuel element bundles, which may also exert force on the assembly walls.

Figure 3A:
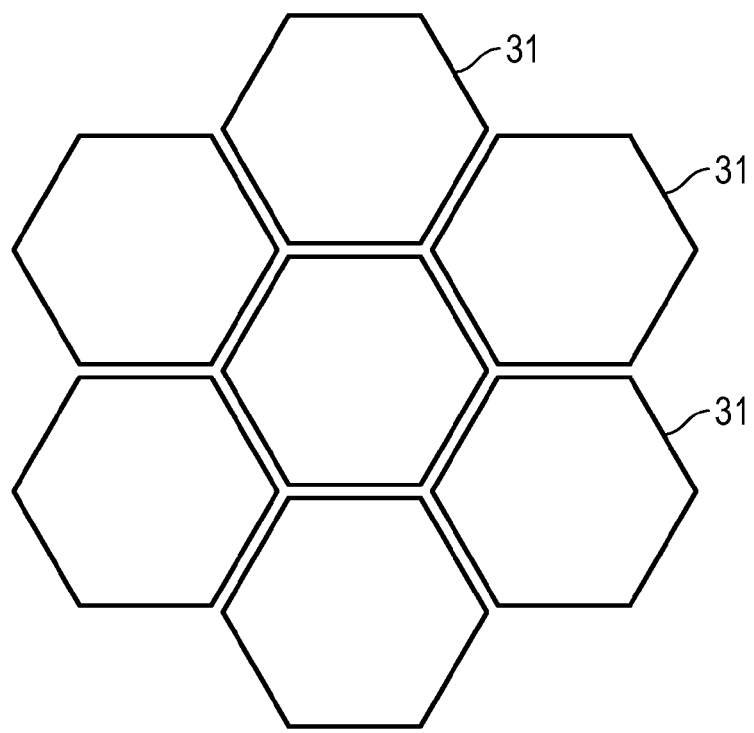
FIGS. 3a-3b provide schematics showing a hex-duct and a dodecaduct, respectively, configuration in a fuel assembly in one exemplary embodiment.
Figure 3B:
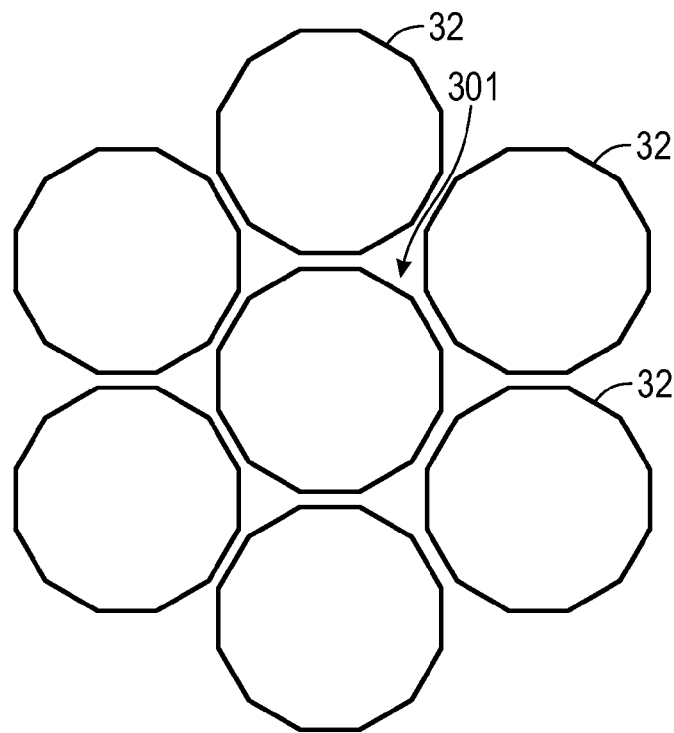

Referring to FIG. 3a, current assemblies, such as those used in liquid metal cooled fast reactors, use a single walled, hexagonal fuel duct 31 to house wire-wrapped fuel elements. One current method to limit distortion is to make thicker walled hex-ducts. However, this may increase the ratio of structural material to fuel within a reactor core, decreasing a reactor's neutron economy and increasing the cost and weight of the assembly. Ducts with 12-sides have also been considered in current designs, shown as 32 in FIG. 3b. Twelve-sided ducts 32 have a decreased side length and increased side-to-side internal angle. Such a design decreases the bending stress in the duct and therefore decreases the distortion. However, configuration of these 12-sided assemblies into their most compact lattice configuration (dodeca-cell packing as opposed to hex-cell packing; see FIG. 3b) may leave interstitial spaces 301, which need to be filled with coolant or fuel. In the former case, the ratio of coolant to fuel increases. In the latter case, multiple assembly types are needed for the reactor, increasing costs and fuel management complexity. Thus, none of these current approaches is desirable. The fuel assemblies described herein overcome these challenges.

Fuel Duct Configuration

Figure 4:
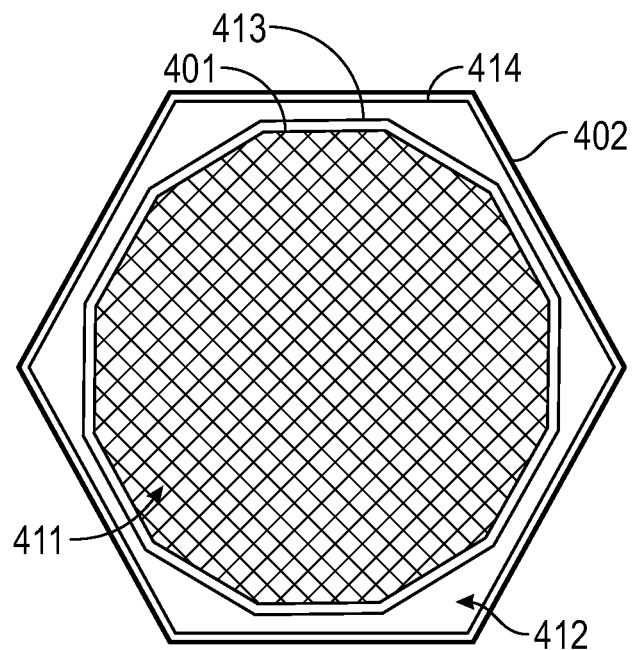
FIG. 4 provides a schematic showing a multi-walled duct design of a fuel assembly in one exemplary embodiment.

Another aspect of the embodiments described herein is related to a structural component of a fuel assembly or the assembly itself. For example, one embodiment is related to a fuel duct 16 of a fuel assembly, as shown in FIG. 1a. Referring to FIG. 4, the fuel duct in accordance with one embodiment may include a first hollow structure 401 having a first cross-sectional geometry and a second hollow structure 402 having a second cross-sectional geometry. The second hollow structure may be disposed exterior or interior to the first hollow structure—FIG. 4 illustrates the former scenario. In one embodiment, the second cross-sectional geometry is different from the first cross-sectional geometry. In another embodiment, the second cross-sectional geometry is at least substantially the same as the first cross-sectional geometry. "Substantially the same" geometry in one embodiment herein may refer to the same geometry but with very small variations, such as a (slightly) blunt edge (instead of a sharp edge) or a side including at least some curvature. In another embodiment, the second cross-sectional geometry is the same as the first cross-sectional geometry.

The terms "first," "second," "third," etc., herein merely denote separate entities, and the order of these entities may be changed. Thus, the association between the numbers and the entities are not limiting. In some embodiments, the hollow structure may be referred to as a "duct," as that in a "multi-ducted" configuration.

The term "geometry" herein may refer to the shape and/or size of a material. For example, the structure described herein may have a cross-sectional area having a shape including (or of) a polygon having a plurality of sides (or edges), a circle, or an irregular shape. A polygon may be a triangle, square, rectangle, pentagon, hexagon, heptagon, octagon, enneagon, decagon, hendecagon, dodecagon, tridecagon, tetradecagon, pentadecagon, or other geometries having more sides. A circular cross-sectional area herein may also refer to an elliptical cross-sectional area. Thus, depending on the cross-sectional area, the structure in a three-dimensional sense may be a cube (or more sides), cylinder, etc.

In some embodiments, the interior (relative to the second structure) first hollow structure and the exterior (relative to the first structure) second hollow structure may each include a polygon as their respective cross-sectional geometries. In one embodiment, the first cross-sectional geometry may include a polygon having more sides than the second cross-sectional geometry. In another embodiment, first cross-sectional geometry may include a polygon having the same number of sides as the second cross-sectional geometry. In another embodiment, the first cross-sectional geometry may include a polygon having fewer sides than the second cross-sectional geometry.

In the case wherein the first and the second hollow structures have polygonal cross-sectional areas, the areas may have any of the aforementioned polygonal geometries. In one embodiment, the first cross-sectional geometry may include a dodecagon. In one embodiment, the second cross-sectional geometry may include a hexagon. In one embodiment where the first cross-sectional geometry may include a polygon having more sides than the second cross-sectional geometry, the first cross-sectional geometry may include a dodecagon and the second cross-sectional geometry may include a hexagon. In an alternative embodiment, the first cross-sectional geometry may include an octagon and the second cross-sectional geometry may include a square. In another embodiment, the first cross-sectional geometry may include a circle and the second cross-sectional geometry may include an octagon. In an alternative embodiment, the first cross-sectional geometry may include a polygon having fewer sides than the second cross-sectional geometry—e.g., the first cross-sectional geometry includes a hexagon and the second cross-sectional geometry includes an octagon.

The hollow structures of the fuel assembly may have the same thickness or different thicknesses. The thickness need not be limited to any particular value and may vary depending on the application. For example, the thickness of the first hollow structure and/or the second hollow structure may be between about 0.1 mm and about 20 mm—e.g., between about 0.2 mm and about 15 mm, between about 0.3 mm and about 10 mm, between about 0.5 mm and about 5 mm, between 1 mm and about 3 mm, etc. The thickness of the first and/or second hollow structures may be uniform along the circumference of their respective cross-sectional geometries, though it need not be. In one embodiment, the at least one of the first hollow structure and the second hollow structure has a wall thickness varying along at least a portion of the respective circumferences of the first and second cross-sectional geometries. In some embodiments, a change in the thickness along a side or multiple sides may result in a change of curvature. As a result, as described above, a polygon with varying thicknesses and/or curvature along its different sides may become not a hexagon but be still substantially the same as a polygon geometry. The change of thickness and/or curvature may be optimized for different purposes—e.g., dilation performance.

The hollow structures of the fuel assembly may have the same chemical composition or different chemical compositions. In some embodiments, the first and/or second hollow structures may include at least one material chosen from a Zr-based alloy, a Fe-based alloy, a ceramic, a refractory metal, a refractory alloy, and a composite material. The ceramic may be a carbide (e.g., silicon carbide), nitride, oxynitride, etc. For example, the first and/or second hollow structures may include a Fe-based alloy, including steel. The steel may be chosen from at least one of ferritic steel, martensitic steel, ferritic martensitic steel, and non-ferritic steel. Other materials that are suitable in a radiation environment may be used.

As shown in FIG. 4, the interior 411 of the first hollow structure may be sealed from outside of the first hollow structure. In one embodiment, space 411 in the sealed inner first hollow structure may contain at least one coolant in the interior space. The coolant may be disposed in a space 412 defined between the first hollow structure and the second hollow structure. In one embodiment, the inner first hollow structure is sealed such that it is full of coolant or contains a fluid or material that is distinct from the coolant. The fluid may be one having desirable neutron properties—e.g., multiplying, absorbing, or effectively transparent to radiation. In one embodiment, the inner space 411 may be substantially empty, such that any neutronic effect may be minimized. In another embodiment, the interior space 411 of the first hollow structure is substantially free of coolant. The space 411 may also be used to house instruments for both testing within the reactor and observation of normal and non-normal operating conditions, as well as devices to control the reactor, or to provide desired reactivity feedback, as described above. Alternatively, the interior may be exposed to the outside of the first hollow structure. The interior of the first hollow structure may be empty or may include certain materials. For example, at least one coolant may be disposed in the interior of the first hollow structure. The coolant may be any suitable coolant, depending on the application. For example, the coolant may include sodium.

The space 412 defined by the first hollow structure and the second hollow structure may be empty; alternatively, additional elements may be present in the space. The space 412 may be defined by an outer wall 413 of the first hollow structure and an inner wall 414 of the second hollow structure. For example, in the space 412 may be a coolant, which may be any of the aforedescribed coolants. Alternatively (and additionally), in the space there may be at least one structural member as aforedescribed. In another embodiment, in the space 412 there may be at least one instrument, which may be configured to test, observe and provide feedback regarding operation conditions (e.g., of the fuel assembly). The instrument may be the same as or different from that employed in the interior space of the hollow structure as described above.

In one embodiment, in the fuel duct the first hollow structure may have at least one dimension that is changeable under stress. Depending on the geometry of the first hollow structure, the dimension may refer to width, length, diameter, etc. The change in dimension may refer to, for example, expansion thereof. In one embodiment, the second hollow structure is adapted to distribute therethrough at least a portion of the stress of the first hollow structure.

The first hollow structure may be adapted to expand radially outwards under stress such that at least a portion of the first hollow structure physically contacts the second hollow structure. In some cases, expansion need not happen. For example, the first hollow structure may substantially maintain at least one of its dimensions (such as all of its dimensions) and geometry under stress. In one embodiment, the first hollow structure is adapted to change at least one dimension thereof under stress; and the second hollow structure is adapted to distribute at least some of the stress of the first hollow structure. In another embodiment, the first hollow structure does not change its dimension and/or geometry under stress, and yet the second hollow structure may distribute at least some of the stress. The second hollow structure may distribute at least some of the stress of the first structure with a minimal amount of change (such as no change) of its dimension and/or geometry. In one embodiment, the second hollow structure is configured to substantially maintain at least one of its dimensions (such as all dimensions) and geometry during distribution therethrough of the stress of the first hollow structure.

When the first hollow structure is not subjected to any stress, particularly that arising from the pressure in the interior thereof, the first hollow structure need not be in physical contact with the second exterior hollow structure (as shown in FIG. 4), although it may be. In one embodiment, when under stress the first hollow structure may be adapted to expand outwards until at least a portion thereof is in physical contact with the second hollow structure to distribute the stress. The second hollow structure may be designed and/or configured to distribute the stress without having to change its dimension and/or geometry. In one embodiment, the stress may be (but need not be) uniformly distributed among the different sides of the second hollow structure.

Structural Members

Figure 5:
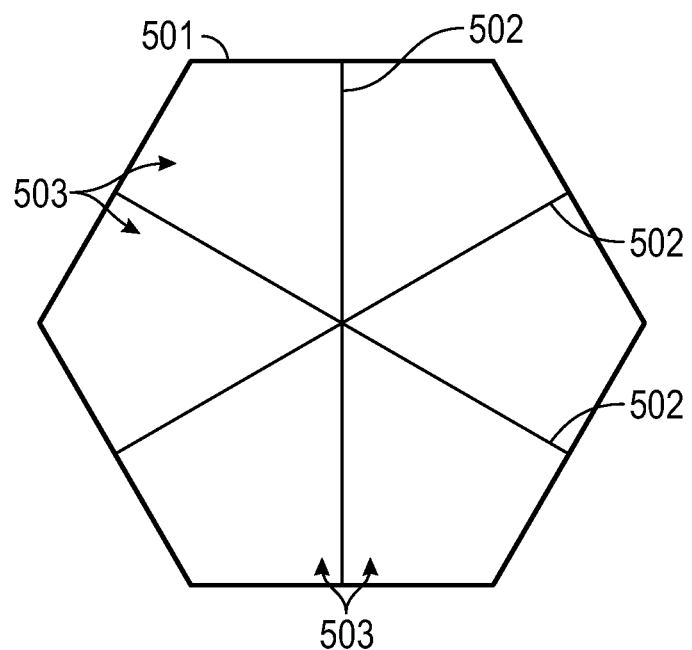
FIG. 5 provides a schematic showing internal structural members used as tensioning devices in the interior of a duct in one exemplary embodiment.

Referring to FIG. 5, the interior 503 of the first hollow structure 501 may include structural members 502. The interior of a first hollow structure space 503 may also be compartmentalized, such as compartmentalized axially. In one embodiment, the axial compartmentalization may be accomplished with a reflector below the fuel column, a void along the length of the fuel column, then coolant above the fluid column. The structural members may be positioned in any way that suits the purpose of the application. For example, one structural member may couple to a point of a first side of the inner first hollow structure to a point of a second side opposite to the first side, as shown in FIG. 5. The point may be any point on the side, such as a mid-point. In one embodiment, the structural member may couple to one corner (instead of to a side) of the first hollow structure to another corner (not shown). The term "couple to" herein may refer to being in contact, such as physical contact (e.g., mechanical coupling). In some other embodiments, the contact may refer to other types of contacts, such as thermal contact, electrical contact, etc. For example, two items being coupled to each other in one embodiment may refer to these two items being connected to each other by physical contact either directly or indirectly (via a third item).

These structural members in the interior of the first hollow structure may be (or act as) tensioning structural members. In one embodiment, the outward force due to coolant internal pressure may be at least partially balanced by tension within these internal structural members as shown in FIG. 5. As a result, this configuration may reduce the distortion of the outer hollow structure (or "duct") by decreasing both normal and bending stresses.

In one embodiment, as shown in FIG. 4, the first hollow structure 401 and the second hollow structure 402 may be spaced apart from each other by a space 412 and not in contact with each other at all. In other words, the first hollow structure and the second hollow structure define a space 412 therebetween in this embodiment. Alternatively, at least a portion of the first hollow structure may be coupled to a portion of the second hollow structure. For example, referring to FIG. 6a, the first hollow structure 601 and second hollow structures 602 may contain space 612 therebetween, while the two structures are in contact with one another.

Figure 6A:
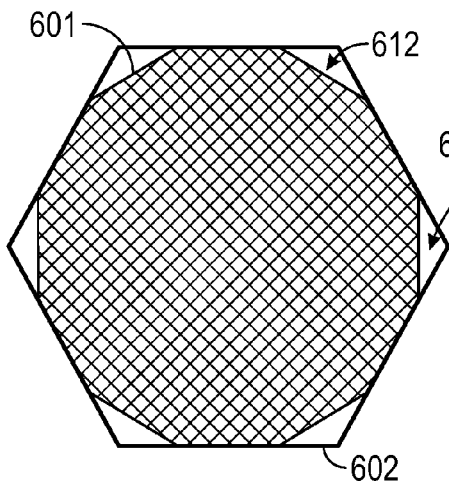
FIGS. 6a-6d illustrate several variations of a multi-walled duct design, with an inner hollow structure and an outer hollow structure (and structural members in some instances) in a fuel assembly in one exemplary embodiment.
Figure 6B:
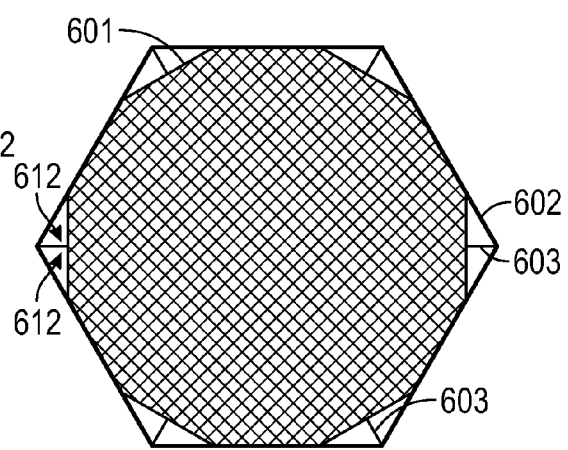

These structural members may be the same or different from the internal structural members in the interior of some first inner hollow structure as described above. FIG. 6b provides an illustration of a fuel duct having a plurality of structural members 603 in the space 612 between the inner hollow structure 401 and the outer hollow structure 602 in one embodiment. In this embodiment, the structural members each couples at a point on a side of (an outer wall of) the inner hollow structure to an (inner) corner of the outer hollow structure. The point may be a mid-point or may be anywhere on the side. The structural member may be placed perpendicularly to the side (as shown in the Figure) but need not be. For example, the structural member may be placed at an angle.

At least one instrument may be disposed in the interior of the first hollow structure. The instrument(s) may be configured to perform at least one function chosen from testing, observing, and providing feedback regarding operation conditions. The conditions may refer to the conditions of any portion of the fuel assembly, including the fuel duct or any portion thereof. The instrument may include a device, such as a sensor device. The instrument may alternatively include a reflector. In one embodiment, the instrument may include a reactivity feedback device, a control element, or both. For example, the instrument may include a control-rod device, a lithium expansion module (LEM), an absorption insertion module (AIM), gas expansion module (GEM), etc.

Figure 6C:
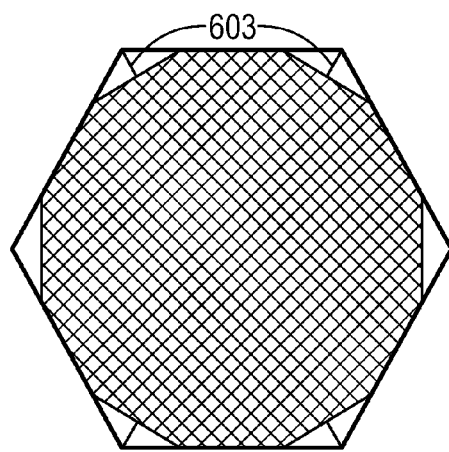
Figure 6D:
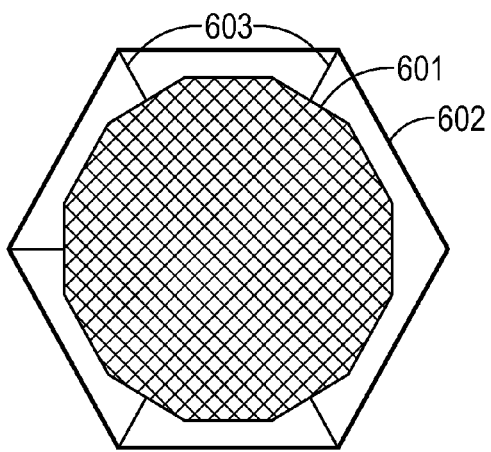

The contact may be accomplished by the sides of the first and second hollow structures being in physical contact (FIG. 6a) and/or via separate structural components 603 (FIGS. 6b-6d). In the latter, the two hollow structures may be coupled to each other via their sides (FIGS. 6b-6c) or solely by connecting by at least one structural member (FIG. 6d). Structural members need not be present on all sides or corners of the hollow structures, though they may be. As shown in, for example, FIGS. 6c-6d, only some of the sides and corners are connected by structural members. The structural member may include (or be, for example, a strut. The structural members may be disposed in the space defined between the first hollow structure and the second hollow structure and physically coupling the first hollow structure and the second structure.

Structural members are not always needed. For example, in one embodiment, structural members between the inner and outer hollow structures may be removed to remove substantially all tensile stresses on the outer hollow structure. In one embodiment, the outer hollow structure may be engineered to accommodate dimensional changes due to void swelling, so that the spaces between fuel assemblies are minimized. In some embodiments, the inner and outer hollow structures may share at least one common face (or side if viewed in one-dimension), as shown in FIGS. 6a-6c.

The structural member may be made of, or include, any suitable materials. For example, the structural member may be chosen from at least one of a metal, metal alloy, ceramic, and polymer. The structural member may include the same composition as or different composition from the first and/or second hollow structure. Depending on the size of the space between the first and the second hollow structures, the structural members may be of various sizes. For example, the structural member may have a diameter that is smaller than, the same as, or greater than that of the thickness of the first and/or second hollow structure.

Penetrations

The first hollow structure and/or the second hollow structure may include penetrations to allow fluid (e.g., coolants) to flow to facilitate removal of heat to maintain thermal conditions. For example, in an example where the fuel assembly is compartmentalized axially, penetrations may allow a coolant to enter the space above the fuel column between the first and second hollow structures. Any of the boundaries of these compartments may be designed to have a change in properties in response to some external condition. For example, one can have fusible plugs that allow a voided space to become filled with coolant or other material if a certain temperature is exceeded.

FIGS. 7a-7d illustrate different phenomena associated with penetrations in the inner duct 710 and outer duct 720 in one embodiment. FIG. 7a provides an illustration of the pressure profile in one embodiment. FIG. 7b illustrates the bypass of fueled region 702 by coolant through the 'voided' portion 701 of the duct; this may take place when additional static pressure is needed outside of the inner portion of the assembly to distribute stress. FIG. 7c illustrates bypass of the above-fueled region 703 by coolant through the voided portion of duct; the above-fueled portion may produce significantly less heat so that the coolant flow rate through the middle of the channel may be reduced. FIG. 7c illustrates bypass of fueled region by coolant through the voided portion of duct with flow back into region above the fuel. FIG. 7d illustrates that coolant flow may be bypassed around the fueled region by letting some fluid escape from the assembly completely. The load pad 730 is also shown in the figure. This can be done to increase static pressure around the entirety of the ducts (in a case where there are multiple fuel assemblies). Flow exiting the assembly will have to squeeze between neighboring ducts which increases pressure, as shown in FIG. 7d.

Power Generation

As described above, the fuel assemblies described herein may be a part of a power or energy generator, which may be a part of a power generating plant. The fuel assembly may be a nuclear fuel assembly. In one embodiment, the fuel assembly may include a fuel, a plurality of fuel elements, and a plurality of fuel ducts, such as those described above. The fuel ducts may include the plurality of fuel elements disposed therein.

At least some of the fuel assemblies described herein may include interstitial spaces among the plurality of the fuel ducts. The interstitial spaces may be defined as the space between the plurality of the fuel ducts. At least one of a coolant, inert gas, fuel material, and a monitoring device can be disposed in at least some of these interstitial spaces. The interstitial spaces may be empty or may include certain materials. For example, in the interstitial spaces may be at least one of a coolant, inert gas, and fuel material. The coolant and/or fuel material may be any of those described above. An inert gas may be any of those known in the art—e.g., nitrogen, a noble gas (e.g., argon, helium, etc). In some embodiments, the interstitial spaces may include an instrument, such as any of those described above that may be present in the interior of the first hollow structure or the space between the first and second hollow structure. In one embodiment, the instrument is a monitoring device monitoring the operation conditions of the fuel assembly.

The fuel assembly described herein may be adapted to produce a peak areal power density of at least about 50 MW/m$^2$—e.g., at least about 60 MW/m$^2$, about 70 MW/m$^2$, about 80 MW/m$^2$, about 90 MW/m$^2$, about 100 MW/m$^2$, or higher. In some embodiments, the fuel assembly may be subjected to radiation damage at a level of at least about 120 displacements per atom ("DPA")—e.g., at least about 150 DPA, about 160 DPA, about 180 DPA, about 200 DPA, or higher.

Method of Making or Using Fuel Assembly

Figure 8A:
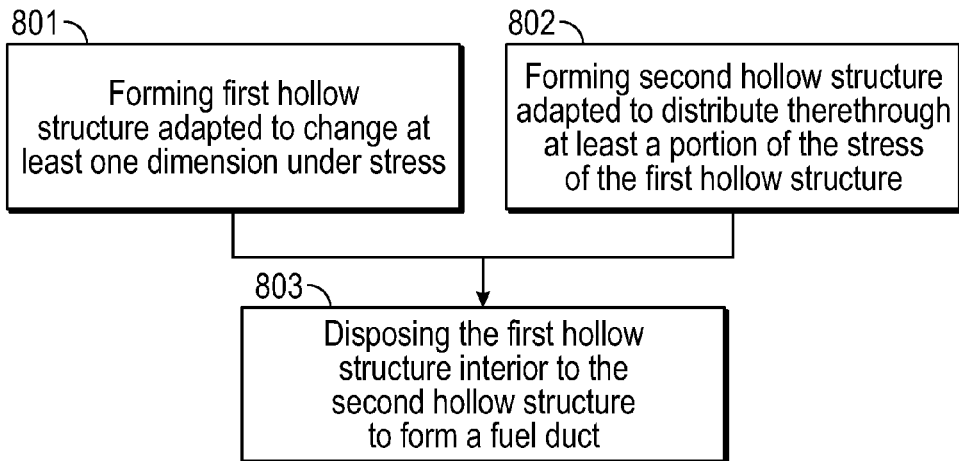
FIGS. 8a and 8b-8d, respectively, provide a flow chart of a process of making a fuel duct of the fuel assembly and illustrative details of the process in one exemplary embodiment.
Figure 8B:
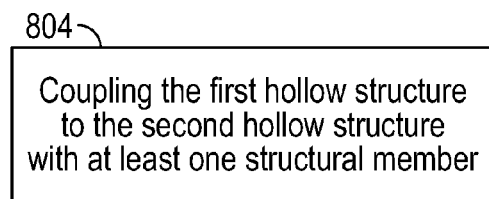
Figure 8C:
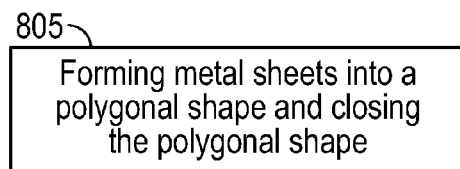
Figure 8D:
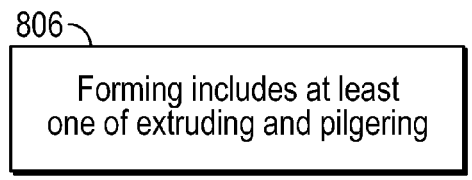

In another aspect, a method of making an article of a fuel assembly is provided. The fuel assembly may be any of the aforedescribed fuel assemblies, including fuel ducts, fuel assemblies, and the like. FIG. 8a provides a flow chart of a process of making a fuel duct of the fuel assembly in one illustrative embodiment. The method may include forming a first hollow structure (step 801), which may be adapted to change at least one dimension thereof under stress, and forming a second hollow structure (step 802), which may be adapted to distribute therethrough at least a portion of the stress of the first hollow structure; and disposing the first hollow structure interior to the second hollow structure to form a fuel duct (step 803) such that a space is defined between the first hollow structure and the second hollow structure. Referring to FIG. 8b, the process may further comprise coupling the first hollow structure to the second hollow structure, such as with at least one structural member (step 804). Referring to FIG. 8c, the process may further comprise forming the first and/or second hollow structure by forming metal sheets into a polygonal shape an closing the polygonal shape (step 805). Referring to FIG. 8d, the process of forming may further comprise at least one process chosen from extruding and pilgering (step 806). In some embodiments, at least one of the first and second hollow structures may already be pre-formed and thus only needs to be provided to undergo a disposing process, which may also include assembling different hollow structures.

Figure 9A:
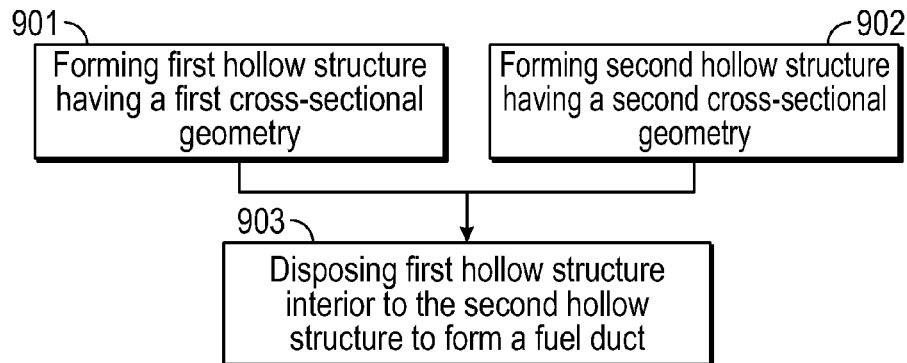
FIGS. 9a and 9b-9e, respectively, provide a flow chart of a process of making a fuel duct of the fuel assembly and illustrative details of the process in one exemplary embodiment.
Figure 9B:
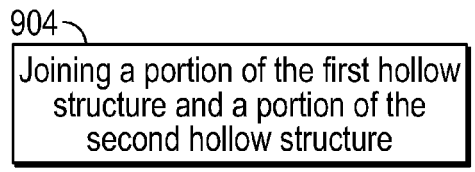
Figure 9C:
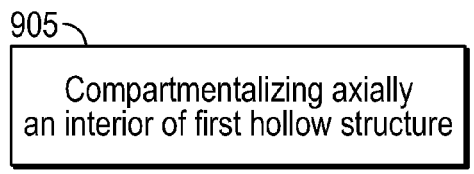
Figure 9D:
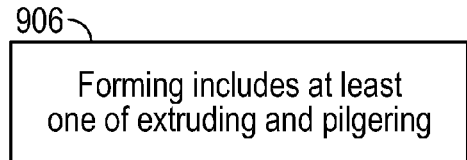
Figure 9E:
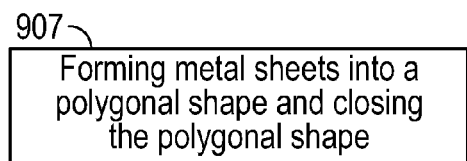

FIG. 9a provides a flow chart of an alternative process of making a fuel duct of the fuel assembly in one illustrative embodiment. The method may include forming a first hollow structure (step 901), which may be adapted to change at least one dimension thereof under stress, and forming a second hollow structure (step 902), which may be adapted to distribute therethrough at least a portion of the stress of the first hollow structure; and disposing the first hollow structure interior to the second hollow structure to form a fuel duct (step 903) such that a space is defined between the first hollow structure and the second hollow structure. Referring to FIG. 9b, the process may further comprise joining a portion of the first hollow structure to the second hollow structure, such as with at least one structural member (step 904). Referring to FIG. 9c, the process may further comprise compartmentalizing axially an interior of the first hollow structure (step 905), as will be described further below. Referring to FIG. 9d, the process may further comprise forming the first and/or second hollow structure by extruding and/or pilgering (step 906). Alternatively (or additionally), referring to FIG. 9e, the process may further comprise forming the first and/or second hollow structure by forming metal sheets into a polygonal shape and closing the polygonal shape (step 907).

The process of forming may involve any techniques available to form structural materials, including hollow structural materials. For example, the process of forming may include a process chosen from at least one of extruding and pilgering. Pilgering may refer to a metal-working process for reducing at least one dimension of a metal-containing tubular structure. In some embodiments, the process of forming may include forming metal sheets into a polygonal (tubular) shape—the term "tube" is employed here merely to describe a three-dimensional structure, and not necessarily a circular cylinder. The process may further comprise at least one of closing the polygonal tube by welding a seam, riveting, forming a seam and tack welding, forming a seam and isostatically compressing the seam and diffusion bonding.

The process of forming may further include providing at least one structural member coupling a portion of the first hollow structure to a portion of the second hollow structure (step 804). The structural member may be any of those described above. In some embodiments, the process of forming may further comprise joining a first portion of the first hollow structure and a second portion of the second hollow structure. The joining may be carried out with at least one structural member. In one embodiment, the joining process need not involve welding the at least one structural member axially with respect to the first portion and the second portion. For example, the assembly may be fitted with a keeper type device or a guide. In one embodiment, the inner hollow structure may be sled into the outer hollow structure.

Figure 10A:
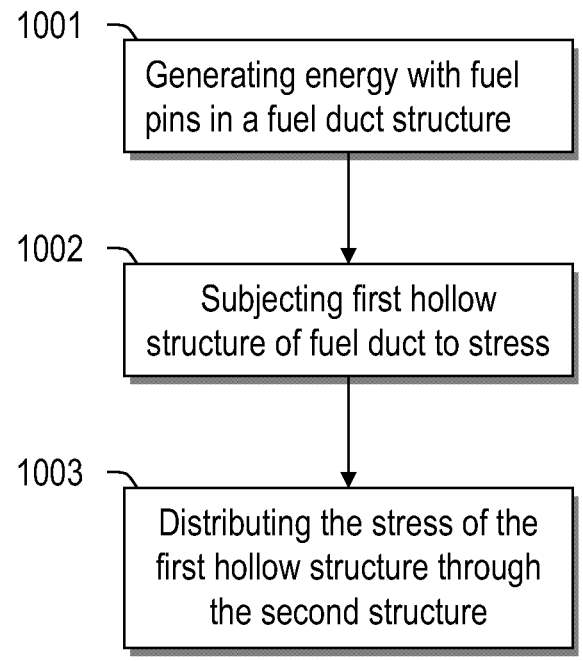
FIGS. 10a and 10b, respectively, provide a flow chart describing the process involved in a method of using the fuel assemblies described herein and illustrative details of the process in one exemplary embodiment.
Figure 10B:
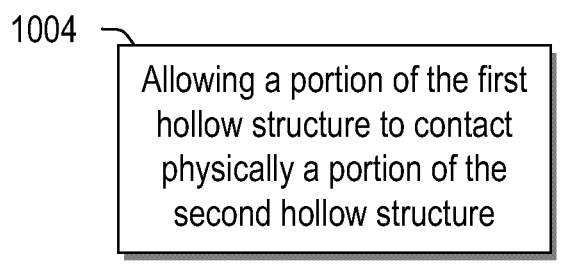

The fuel assemblies described herein may be used to generate power, such as in a nuclear reactor core in a nuclear plant. The power may refer to electrical power, thermal power, radiation power, etc. FIG. 10(a) provides a flow chart describing the process involved in a method of using the fuel assemblies described herein in one illustrative embodiment. In one aspect, the method of using a fuel assembly described herein may include generating energy (e.g., heat) with a plurality of fuel elements disposed within a first hollow structure (step 1001), the first hollow structure being disposed within a second hollow structure; subjecting the first hollow structure to stress (step 1002); and distributing the stress of the first hollow structure through the second hollow structure (step 1003). Referring to FIG. 10(b), the method may further comprise allowing a portion of the first hollow structure to contact physically a portion of the second hollow structure (step 1004).

The fuel assemblies may be any of those aforedescribed. For example, the second hollow structure may be configured to substantially maintain at least one of its dimension and geometry during distribution therethrough of the stress of the first hollow structure. In one embodiment, the second hollow structure may be configured to change at least one of its dimension and geometry during distribution therethrough of the stress of the first hollow structure. In one embodiment, the plurality of fuel elements may include fuel material that includes at least one of uranium and plutonium.

All of the above U.S. patents, U.S. patent application publications, U.S. patent applications, foreign patents, foreign patent applications and non-patent publications referred to in this specification and/or listed in any Application Data Sheet, are incorporated herein by reference in their entirety, to the extent not inconsistent herewith. In the event that one or more of the incorporated literature and similar materials differs from or contradicts this application, including but not limited to defined terms, term usage, described techniques, or the like, this application controls.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any portion of the processes described herein may be automated. The automation may be accomplished by involving at least one computer. The automation may be executed by program that is stored in at least one non-transitory computer readable medium. The medium may be, for example, a CD, DVD, USB, hard drive, etc. The selection of the hollow structures, including the assembly, may also be optimized by using the computer and/or a software program.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

Also, the technology described herein may be embodied as a method, of which at least one example has been provided. The acts performed as part of the method may be ordered in any suitable way. Accordingly, embodiments may be constructed in which acts are performed in any order different from that illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "including" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

In the claims, as well as in the specification above, all transitional phrases such as "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A nuclear fuel assembly, comprising:
    a plurality of nuclear fuel pins;
    a fuel duct configured for insertion into a nuclear reactor vessel, including:
        a first hollow structure having a first cross-sectional shaped geometry, the first hollow structure configured to receive the plurality of nuclear fuel pins, and
        a second hollow structure disposed around the first hollow structure, and having a second cross-sectional shaped geometry, the second cross-sectional shaped geometry being different from the first cross-sectional shaped geometry and defining a convex area,
        wherein the first hollow structure and the second hollow structure define an interior space between the first hollow structure and the second hollow structure, and wherein the first hollow structure permits fluid communication between the interior space and a region inside the first hollow structure.

2. The fuel assembly of claim 1, wherein the first cross-sectional geometry includes a polygon having more sides than the second cross-sectional geometry.

3. The fuel assembly of claim 1, wherein the first cross-sectional geometry includes a polygon having fewer sides than the second cross-sectional geometry.

4. The fuel assembly of claim 1, wherein the first cross-sectional geometry includes a dodecagon.

5. The fuel assembly of claim 1, wherein the second cross-sectional geometry includes a hexagon.

6. The fuel assembly of claim 1, wherein the first cross-sectional geometry includes a dodecagon and the second cross-sectional geometry includes a hexagon.

7. The fuel assembly of claim 1, wherein at least one of the first hollow structure and the second hollow structure has a wall thickness of between about 0.2 mm and about 5 mm.

8. The fuel assembly of claim 1, wherein at least one of the first hollow structure and the second hollow structure has a wall thickness varying along at least a portion of a respective circumference of the first cross-sectional geometry and the second cross-sectional geometry.

9. The fuel assembly of claim 1, wherein at least one of the first hollow structure and the second hollow structure includes at least one steel chosen from ferritic steel, martensitic steel, and non-ferritic steel.

10. The fuel assembly of claim 1, wherein at least one of the first hollow structure and the second hollow structure includes at least one material chosen from a Zr-based alloy, a Fe-based alloy, a ceramic, a refractory metal, a refractory alloy, and a composite material.

11. The fuel assembly of claim 1, wherein at least a portion of the first hollow structure is in physical contact with a portion of the second hollow structure.

12. The fuel assembly of claim 11, wherein at least a portion of the first hollow structure is in direct physical contact with a portion of the second hollow structure.

13. The fuel assembly of claim 12, wherein the first hollow structure has a periphery that is in direct physical contact with the second hollow structure.

14. The fuel assembly of claim 12, wherein the first hollow structure has at least one side that is in direct physical contact with the second hollow structure.

15. The fuel assembly of claim 1, wherein the first hollow structure is spaced apart from the second hollow structure.

16. The fuel assembly of claim 1, wherein at least a portion of the first hollow structure is coupled to at least a portion of the second hollow structure by at least one structural member.

17. The fuel assembly of claim 1, wherein the interior of the first hollow structure is sealed.

18. The fuel assembly of claim 1, further including a coolant disposed in an interior of the first hollow structure.

19. The fuel assembly of claim 1, further including at least one instrument disposed interior the first hollow structure, the at least one instrument being configured to perform at least one function chosen from test, observe, and provide feedback regarding operational conditions.

20. A nuclear fuel assembly, comprising
a nuclear fuel,
a plurality of nuclear fuel elements, and
a plurality of fuel ducts having the plurality of nuclear fuel elements disposed therein, at least one of the plurality of the fuel ducts including:
a first hollow structure having a first cross-sectional shaped geometry, the first hollow structure containing more than one of the plurality of nuclear fuel elements, and
a second hollow structure disposed around the first hollow structure, and having a second cross-sectional shaped geometry, the second cross-sectional geometry being different from the first cross-sectional geometry and defining a convex area,
wherein the first hollow structure and the second hollow structure define an interior space between the first hollow structure and the second hollow structure, and
wherein the first hollow structure permits fluid communication between the interior space and a region inside the first hollow structure.

21. The fuel assembly of claim 20, wherein the at least one of the plurality of fuel ducts further includes at least one structure member that connects a point on a side of the first cross-sectional geometry of the first hollow structure to a corner of the second cross-sectional geometry of the second hollow structure.

22. The fuel assembly of claim 20, wherein the plurality of nuclear fuel elements are disposed in an interior of the first hollow structure.

23. The fuel assembly of claim 20, wherein the plurality of the fuel ducts define interstitial spaces therebetween, at least one of a coolant, inert gas, fuel material, and a monitoring device, being disposed in the interstitial spaces.

* * * * *